US005425306A

United States Patent [19]

Binford

[11] Patent Number: 5,425,306

[45] Date of Patent: Jun. 20, 1995

[54] COMPOSITE INSERT FOR USE IN A PISTON

[75] Inventor: John D. Binford, Richmond, Ind.

[73] Assignee: Dana Corporation, Toledo, Ohio

[21] Appl. No.: 156,596

[22] Filed: Nov. 23, 1993

[51] Int. Cl.$^{6}$ .................................... F16J 1/04

[52] U.S. Cl. .................................... 92/222; 92/231; 123/193.6

[58] Field of Search ................. 92/222, 231, 213, 224, 92/225; 123/193.6

[56] References Cited

U.S. PATENT DOCUMENTS

| | | | |
|---|---|---|---|
| 1,755,711 | 4/1930 | Soulis . | |
| 2,956,846 | 10/1960 | McCullough . | |
| 3,014,771 | 12/1961 | Nichols . | |
| 4,233,490 | 11/1980 | Shalai et al. . | |
| 4,548,126 | 10/1985 | Donomoto et al. | 92/222 |
| 4,562,327 | 12/1985 | Mielke . | |
| 4,643,078 | 2/1987 | Ban | 92/222 |
| 4,677,901 | 7/1987 | Ban et al. | 123/193.6 |
| 4,708,104 | 11/1987 | Day et al. . | |
| 4,735,128 | 4/1988 | Mahrus et al. | 92/212 |
| 4,971,003 | 11/1990 | Suzuki et al. | 92/212 |
| 5,119,777 | 6/1992 | Mielke et al. | 123/193.6 |

FOREIGN PATENT DOCUMENTS

| | | | |
|---|---|---|---|
| 0071553 | 3/1988 | Japan | 92/212 |

*Primary Examiner*—Thomas E. Denion

*Attorney, Agent, or Firm*—Dykema Gossett

[57] ABSTRACT

An annular composite insert is cast which includes distinct particles such as cast iron dispersed throughout the base metallic alloy. The insert is then placed in a piston mold, and a piston cast such that the insert maintains a radially outer face generally flush with a radially outer surface of a piston head of the piston. The base metal of the poured piston is preferably the same as that of the insert so that the insert bonds to the piston head and shares the same thermal expansion characteristics. The insert is machined to form grooves adapted to receive a piston ring. The particles of the insert are exposed to provide superior wear resistance, support to the piston ring so that microwelding is reduced, and also to act as a dry lubricant in a preferred embodiment.

6 Claims, 1 Drawing Sheet

COMPOSITE INSERT FOR USE IN A PISTON

FIELD OF THE INVENTION

The present invention relates to a cast piston for use in an internal combustion engine and more particularly to a insert for use in such a piston.

BACKGROUND OF THE INVENTION

A piston for use in an internal combustion engine typically includes an insert about its circumferential extent. Grooves are formed in an outer radial face of the insert and are adapted to receive piston rings. The insert is generally formed from a ferrous alloy having a greater hardness and resistance to wear than the material of the piston body and piston head. However, the use of a ferrous alloy insert in a piston of a dissimilar metal such as aluminum results in unequal thermal expansion between the insert and the piston. As a result, a gap may be formed between the insert and the piston head that acts as a thermal barrier, preventing the transfer of heat from the insert during piston operation. Further, such a gap may result in undesirable localized stresses being applied by the piston on a corresponding cylinder wall, reducing engine life. Complete failure may occur if the insert separates from the piston.

One alternative to a ferrous metal insert is an insert formed of an alloy having increased hardness and wear resistance with a thermal expansion similar to that of the piston head and piston body. However, such alloys must be customized for a particular application, and are both difficult and expensive to develop. Further, the use of such an alloy does not eliminate a problem known as microwelding, wherein material from a piston ring and the insert are exchanged, bonding the ring to the insert. Such unwanted bonding may result in piston failure. Nor do such alloys typically provide any type of dry lubrication between a piston ring and an insert.

Another alternative to a ferrous metal insert involves the use of methods wherein material is applied in a customized fashion to a non-cast piston body and head and then machined to form an insert. The customized application of material to a non-cast piston is expensive, and subject to unreliability.

SUMMARY OF THE INVENTION

An improved annular composite insert for use with a cast piston of an internal combustion engine is formed by heating a metallic alloy comprising a base metal such as aluminum to a molten temperature. Then distinct particles having a preferred diameter of approximately 0.10 mm, with a higher melting temperature than the alloy, are introduced into the molten alloy. A preferred particle material is cast iron. The particles are mixed into the molten alloy until the particles are dispersed throughout, forming an essentially homogeneous mixture. The particles comprise between five (5) and forty (40) percent of the mixture. Then the resulting slurry is poured into a mold to cast the insert.

The cast insert is placed in a piston mold and a composite piston with a piston body and a separate piston head poured. The insert is positioned in the piston mold such that it maintains a radially outer face generally flush with a radially outer surface of the piston head. Cast inserts and pistons are preferred in part because of the cost and reliability benefits that casting provides over other manufacturing options.

The composite piston is preferably poured using a metallic alloy comprising the same base metal as that used for the insert. By including the same base metal, both the insert and the piston head more readily bond to one another with a stronger bond than is typically created between inserts and the material of a piston head. Further, the insert and piston heads share thermal expansion characteristics, eliminating undesirable bond separation.

After the piston has been cast, normal machining and trimming operations are undertaken. In particular, one or more annular piston ring grooves are machined in the insert. The exposed particles provide a superior wear surface for an installed piston ring. In the case of particles comprising cast iron, the cast iron includes graphite which acts as a superior dry lubricant on the contacting interface. Further, a piston ring that is supported by the particles has a greatly reduced tendency to microweld with the material of the piston head.

BRIEF DESCRIPTION OF THE DRAWINGS

The features and inventive aspects of the present invention will become more apparent upon reading the following detailed description, claims, and drawings, of which the following is a brief description:

DESCRIPTION OF PREFERRED EMBODIMENTS

Figure 1:
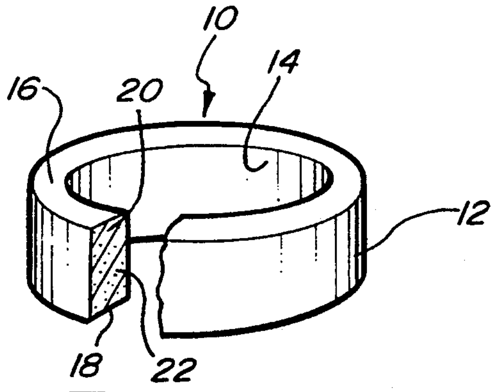
FIG. 1 is a perspective view of a composite insert according to the present invention, but shown before groove formation.

An annular composite piston insert 10, illustrated in FIG. 1 includes a radially outer face 12, a radially inner face 14, an upper face 16, and a lower face 18. Insert 10 is formed by heating a metallic alloy 20 to a molten temperature and introducing distinct particles 22 with a higher melting point and a greater hardness into the molten alloy 20. The particles 22 are mixed in the alloy 20 until they are generally uniformly dispersed throughout the molten alloy 20 to form an essentially homogeneous mixture, and the resulting slurry poured into a mold to cast the annular insert 10.

Preferably, the metallic alloy 20 is primarily aluminum. Aluminum is light with excellent heat transfer characteristics. The particles 22 are preferably cast iron, although they may also be carbides, oxides, or other metals. The particles 22 generally comprise between five (5) and forty (40) percent of the insert 10. In a preferred embodiment, the percentage of particles 22 is between five (5) and fifteen (15) percent. The size of particles 22 may be varied depending on the particle composition and piston application. However, a preferred particle diameter is approximately 0.10 mm.

Figure 2:
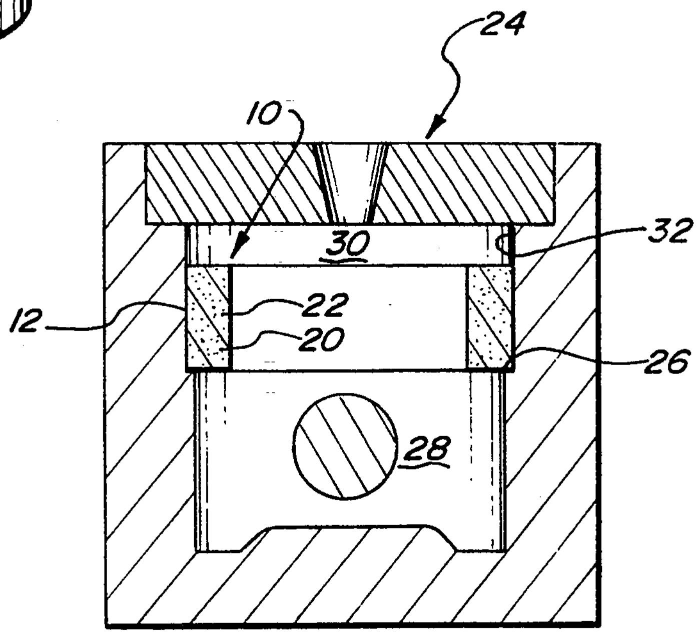
FIG. 2 is a cross-sectional view of the insert of FIG. 1 after placement in a piston mold.

After insert 10 has been cast, it is selectively trimmed so that face 12 has a desired diameter. To enhance the bonding process between insert 10 and a mating component, it may be preferable to undertake a tinning process using a material such as molten zinc. Then insert 10 is inserted into a piston mold 24, as shown in FIG. 2. Mold 24 includes a shoulder 26 in a transition zone between a lower portion 28 and an upper portion 30 and insert 10 is received on shoulder 26. The diameter of outer face 12 of insert 10 generally corresponds to the diameter of inner wall 32 of upper portion 28.

Figure 3:
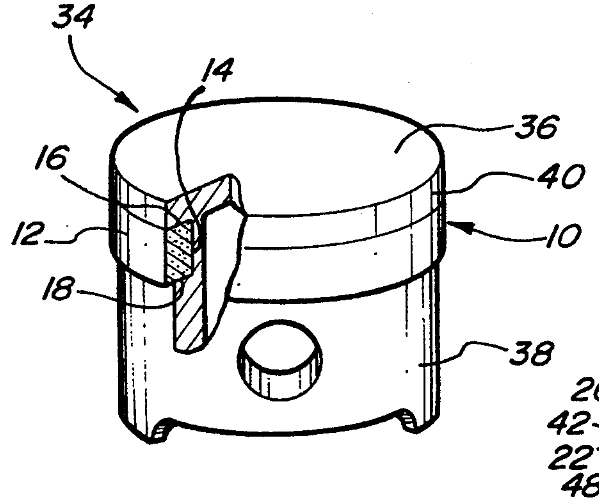
FIG. 3 is a cut-away perspective view of a cast composite piston which incorporates the insert of FIGS. 1 and 2.

Once insert 10 has been properly inserted into piston mold 24, an annular composite piston 34 is poured such that insert 10 is cast in a piston head 36, as shown in FIG. 3. Casting is a preferred manufacturing option for both insert 10 and piston 34 in part because of the cost savings that result while still providing the desired benefits of the present invention. Piston head 36 is formed by portion 30 of piston mold 24 (shown in FIG. 2). Piston 34 also includes a piston body 38 formed by portion 28 of piston mold 24 (shown in FIG. 2). Face 12 of insert 10 is generally flush with radially outer surface 40 of piston head 36, while faces 14, 16, and 18, are surrounded by the material of piston head 36. Unlike typical inserts, there is no gap between faces 14, 16, and 18 of the insert 10, and the piston head 36. Thus, there is no thermal barrier that prevents transfer of heat from the insert 10 to the piston 34 during piston operation. Thus, the insert 10 operates at a lower temperature, extending piston life.

In a preferred embodiment, both piston 34 and insert 10 include the same base metal. In a more preferred embodiment, the base metal of such an alloy is aluminum. By being primarily of the same alloy, both insert 10 and piston head 36 more readily bond to one another, with the resulting bond being stronger than prior art pistons having a insert made of a dissimilar base metal. Further, insert 10 and piston head 36 share common thermal expansion characteristics, expanding and contracting to the same extent in response to changes in temperature, eliminating undesirable bond separation.

Figure 4:
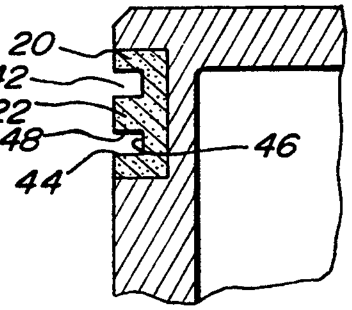
FIG. 4 is a partial cross-sectional view of part of a machined composite piston including ring grooves formed in the insert.

After piston 34 has been poured, normal machining and trimming operations are undertaken including any necessary operations to make face 12 of insert 10 more flush with the outer surface 40 of piston head 36. In particular, one or more annular ring grooves 42 may be machined in insert 10, as shown in FIG. 4, to accept a piston ring (not shown). Particles 22 are exposed along walls 44, 46, and 48, of each ring groove 42 to provide a superior wear surface for a piston ring. In the case of particles comprising cast iron, the cast iron includes graphite which acts as a superior dry lubricant on the contacting interface. Further, a piston ring that is supported by particles having a greater hardness or higher melting temperature than the base alloy has a greatly reduced tendency to microweld with the material of the piston head. Finally, the use of particles 22 in insert 10 is relatively inexpensive while providing the ready ability to alter the composition, size, and quantity of such particles.

Preferred embodiments of the present invention have been described. It is to be understood that variations and modifications may be employed without departing from the scope of the present invention. Accordingly, the following claims should be studied to learn the true scope of the present invention.

I claim:

1. A composite metal piston comprising:

a discrete annular insert comprising a metallic alloy including a plurality of discrete particles dispersed throughout said alloy and adapted to be placed in a piston mold;

an annular molded piston body and head, the insert being cast in said head such that said insert includes a radially outer face flush with a radially outer surface of said head;

wherein said piston, including said insert and said piston body is primarily aluminum; and wherein said particles are formed from cast iron.

2. A piston as recited in claim 1, wherein said particles comprise between five (5) and forty (40) percent of said insert.

3. A piston as recited in claim 1, wherein said particles comprise between five (5) and fifteen (15) percent of said insert.

4. A piston as recited in claim 1, wherein said particles comprise approximately fifteen (15) percent of said insert.

5. A piston as recited in claim 1, wherein said particles are formed from at least one of cast iron, metallic carbides, and metallic oxides having a greater melting point than said alloy.

6. A piston as recited in claim 1, wherein said piston includes piston ring grooves machined in said insert, exposing said particles.

* * * * *